(12) United States Patent
Kamijo

(10) Patent No.: US 7,527,884 B2
(45) Date of Patent: May 5, 2009

(54) FUEL PROCESSING SYSTEM AND ITS SHUTDOWN PROCEDURE

(75) Inventor: Motohisa Kamijo, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 422 days.

(21) Appl. No.: 11/078,391

(22) Filed: Mar. 14, 2005

(65) Prior Publication Data

US 2006/0204800 A1    Sep. 14, 2006

(51) Int. Cl.
- H01M 8/18 (2006.01)
- H01M 8/04 (2006.01)
- C01B 3/12 (2006.01)
- B01J 11/00 (2006.01)
- B01J 8/04 (2006.01)

(52) U.S. Cl. .................. 429/20; 429/17; 423/655; 422/189; 422/190; 422/198

(58) Field of Classification Search .................. 429/20, 429/17; 422/188, 198, 211, 189, 190; 423/655
See application file for complete search history.

(56) References Cited

U.S. PATENT DOCUMENTS

| | | | |
|---|---|---|---|
| 5,464,606 A | 11/1995 | Buswell et al. | |
| 6,103,411 A * | 8/2000 | Matsubayashi et al. | 429/17 |
| 6,242,120 B1 * | 6/2001 | Herron | 429/22 |
| 6,322,917 B1 | 11/2001 | Acker | |
| 6,444,179 B1 * | 9/2002 | Sederquist | 422/191 |
| 6,485,853 B1 | 11/2002 | Pettit et al. | |
| 6,783,879 B2 | 8/2004 | Skala et al. | |
| 6,846,585 B2 * | 1/2005 | Robb et al. | 429/20 |
| 6,932,848 B2 * | 8/2005 | Dardas et al. | 48/127.7 |
| 2002/0018738 A1 | 2/2002 | Woods et al. | |
| 2002/0090329 A1 | 7/2002 | Ternan | |
| 2002/0110504 A1 | 8/2002 | Gittleman et al. | |
| 2002/0122965 A1 | 9/2002 | Yu | |
| 2002/0168306 A1 | 11/2002 | Gittleman | |
| 2003/0054213 A1 | 3/2003 | Ishikawa | |
| 2003/0154654 A1 | 8/2003 | Goebel | |
| 2004/0013586 A1 | 1/2004 | Oh et al. | |
| 2004/0020124 A1 | 2/2004 | Russell et al. | |

* cited by examiner

Primary Examiner—Patrick Ryan
Assistant Examiner—Thomas H. Parsons
(74) Attorney, Agent, or Firm—McDermott Will & Emery LLP

(57) ABSTRACT

A fuel cell system comprises a fuel cell including an anode and cathode, a fuel reformer, and a water gas shift reactor. The fuel cell system is shutdown by shutting down electrical generation and then supplying air to the water gas shift reactor to oxidize CO and $H_2$ remaining in the water gas shift reactor after shutdown of electrical generation. The introduction of air to the water gas shift reactor controls CO poisoning of the fuel cell and the emission of flammable and poisonous gases from the fuel cell system after the shutdown of electrical generation.

12 Claims, 1 Drawing Sheet

FUEL PROCESSING SYSTEM AND ITS SHUTDOWN PROCEDURE

TECHNICAL FIELD OF THE INVENTION

This invention relates to fuel cell systems and in particular fuel cell systems for use in motor vehicle applications.

BACKGROUND OF THE INVENTION

Fuel cells have been developed as alternative power sources for motor vehicles, such as electrical vehicles. A fuel cell is a demand-type power system in which the fuel cell operates in response to the load imposed across the fuel cell. Typically, a liquid, hydrogen-containing fuel, for example, gasoline, methanol, diesel, naphtha, etc. serves as a fuel supply for the fuel cell after the fuel has been converted into a gaseous stream containing hydrogen. Such liquid fuels are particularly desirable as the source of the hydrogen used by the fuel cell owing to their ease of on board storage and the existence of an infrastructure of service stations that can conveniently supply such liquids. The conversion to the gaseous stream is usually accomplished by passing the fuel through a fuel reformer to convert the liquid fuel to a hydrogen ($H_2$) gas stream that usually contains other gases such as carbon monoxide (CO), carbon dioxide ($CO_2$), methane, water vapor ($H_2O$), oxygen, and unburned fuel. The hydrogen is then used by the fuel cell as the fuel in the generation of electricity for the vehicle.

A polymer electrolyte membrane (PEM) type of fuel cell is generally composed of a stack of unit cells comprising a polymer electrolyte membrane enclosed between electrodes and gas diffusion layers, and further enclosed between separators that contain channels for fuel gas and oxidant gas. The stack is fixed by end plates. A current collector may be provided between the end plate and stack, or the end plate itself may function as a current collector. When hydrogen is used as the fuel gas and oxygen is used as the oxidant gas, electrons are released due to a chemical reaction, and water is formed as a by-product, via the reaction:

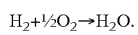
$$H_2 + \tfrac{1}{2}O_2 \rightarrow H_2O.$$

Consequently, the fuel cell is an energy source that has no adverse impact on the global environment, and has been the focus of much research for use in automobiles in recent years.

PEM fuel cells include a "membrane electrode assembly" (a.k.a. MEA) comprising a thin, proton transmissive, solid polymer membrane-electrolyte having an anode on one of its faces and a cathode on the opposite face. The solid polymer electrolytes are typically made from ion exchange resins such as perfluorinated sulfonic acid. The anode/cathode typically comprise finely divided catalytic particles, often supported on carbon particles, admixed with proton conductive resin.

Because the carbon monoxide produced in the fuel reformer acts as a poison to some fuel cells, such as PEM fuel cells, the carbon monoxide concentration in the hydrogen stream must be removed, or its concentration reduced for example by oxidation, conversion, or separation, before the hydrogen stream can be used in these fuel cells to produce electricity. Optional post-processing of the hydrogen stream to reduce the carbon monoxide content include selective catalytic oxidation and methanation.

For fuel cells such as PEM fuel cells which are sensitive to carbon monoxide, the hydrogen stream is passed to a carbon monoxide oxidation reactor at effective oxidation conditions and contacted with a selective oxidation catalyst to produce a hydrogen gas stream comprising less than about 40 ppm CO. Preferably, the hydrogen gas stream comprises less than about 10 ppm CO, and more preferably, the hydrogen gas stream comprises less than about 1 ppm CO.

The catalytic water gas shift conversion process is well known and is commonly used in processes which manufacture hydrogen gas to reduce CO. In the water gas shift reactor, carbon monoxide is combined with water to yield carbon dioxide and hydrogen according to the following formula:

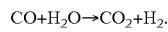
$$CO + H_2O \rightarrow CO_2 + H_2.$$

This reaction, commonly known as the water gas shift reaction, is highly exothermic, liberating about 16,700 BTUs for each pound mole of carbon monoxide converted. Water gas shift (WGS) reactors are often used to reduce the amount of carbon monoxide present in a gas stream typically composed of water vapor, methane, carbon monoxide, carbon dioxide and hydrogen.

Water gas shift reactors are particularly useful in hydrocarbon fueled electric power generation systems including PEM fuel cells. In these systems, fuel is first reformed in a fuel reformer to yield a mixture of hydrogen, carbon dioxide and small amounts of carbon monoxide. This gas mixture is commonly referred to as reformate. The reformate is produced by reacting fuel, air, and water vapor over a catalyst, such as nickel with amounts of other metal, such as cobalt, platinum, palladium, rhodium, ruthenium, iridium and a support such as magnesia, magnesium aluminate, alumina, silica, zirconia, singly or in combination. The reforming catalyst can be a single metal such as nickel or a noble metal supported on a refractory carrier such as magnesia, magnesium aluminate, alumina, silica, or zirconia, singly or in combination, promoted by an alkali metal such as potassium. The reforming catalyst can be granular and is supported as a fixed catalyst bed.

The reformate is then introduced into the WGS reactor, where the carbon monoxide concentration is reduced in order to avoid poisoning by the carbon monoxide of the catalyst employed in the fuel cells and to produce additional hydrogen fuel. Frequently, the reformate stream exiting the WGS reactor is introduced into a preferential oxidation (PROX) reactor, which further reduces the level of carbon monoxide present in the stream.

The conventional WGS reactor is an adiabatic bed in which the process gas temperature increases as the amount of carbon monoxide is reduced by the water gas shift reaction. Due to equilibrium limitations, catalyst activity, and catalyst thermal limits, conventional WGS reactors are generally incapable of reducing the carbon monoxide concentration of a reformate stream much below 2.0%.

The water-gas-shift reaction may be accomplished in a single low temperature shift reactor, or in a two stage shift reactor wherein the reformate stream first passes through a high temperature shift (HTS) reactor, and thence through a low temperature shift (LTS) reactor. A HTS reactor is typically an adiabatic shift reactor having a catalyst, such as iron oxide or chromium oxide, operable to effect the water-gas-shift reaction at about 300° C. to about 500° C. A LTS reactor is typically an adiabatic shift reactor having a catalyst, such as Cu—ZnO, operable to effect the water-gas-shift reaction at about 150° C. to about 280° C. A heat exchanger can be used to cool the reformate exiting the HTS reactor before it enters the LTS reactor.

The high temperature shift catalyst can be selected from the group consisting of iron oxide, chromium oxide and mixtures thereof. The low temperature shift catalyst can comprise cupric oxide (CuO) and zinc oxide (ZnO). Other types of low temperature shift catalysts include copper supported on other transition metal oxides such as zirconia, zinc supported on transition metal oxides or refractory supports such as silica or alumina, supported platinum, supported rhenium, supported palladium and supported rhodium.

Some CO survives the water-gas-shift reaction and needs to be reduced further (i.e. to below about 40 ppm) before the reformate can be supplied to the fuel cell. It is known to further reduce the CO content of $H_2$-rich reformate exiting a WGS reactor by reacting it with oxygen (i.e. as air) in a preferential oxidation reaction carried out in a catalytic PROX reactor. The preferential oxidation reaction is exothermic and proceeds as follows:

$$CO + \tfrac{1}{2}O_2 \rightarrow CO_2.$$

The PROX reactor effluent, a CO-cleansed, $H_2$-rich reformate, is then supplied to the fuel cell.

In a PROX reactor, a limited amount of air is selectively, exothermically reacted with the carbon monoxide, rather than the hydrogen, over a suitable catalyst that promotes such selectivity. When the system is operating under normal steady state conditions, the fuel stream exiting the PROX reactor is sufficiently CO-free so that it can be used in the fuel cell without poisoning the fuel cell catalyst.

Upon fuel cell shutdown, reducing gas ($H_2$) is removed from the fuel processing system. This causes a loss of catalytic activity in the fuel reformer, WGS reactor, and PROX reactor, which normally operate in highly reducing atmospheres. Another problem introduced by fuel cell shutdown is that an inert circulating gas, such as $N_2$, typically must be supplied to the fuel cell system. Because of the limited space in a motor vehicle a nitrogen storage tank is difficult to use in automotive applications. Furthermore, when circulating gas is introduced at system shutdown, the partly processed high-concentration CO in the system is released, unconverted, into the fuel cell and fuel cell exhaust. This causes CO poisoning of the fuel cell, impedes the subsequent restart, and causes emission of a regulated substance (CO) outside the system. In addition, since the CO is mixed with partly processed $H_2$, flammable gases (CO and $H_2$) are released in the fuel cell exhaust. Further, additional components, such as circulating blowers and circulation lines for the inert gas are necessary, which increase the space requirements and cost of the fuel cell system.

SUMMARY OF THE INVENTION

There exists a need in the fuel cell art to eliminate CO poisoning of fuel cells after the shutdown of electrical generation. There exists a need in the fuel cell art to eliminate the emission of flammable and poisonous CO and flammable $H_2$ gases from fuel cells after electrical shutdown. There exists a need in the fuel cell art for a rapid and efficient startup of electrical generation.

There exists a need in the electrical vehicle art for electrical vehicles powered by fuel cells that rapidly and efficiently generate electricity upon demand. There exists a need in the electrical vehicle art for electrical vehicles powered by space and cost efficient fuel cell systems which do not require inert gas storage tanks, circulating lines, and blowers.

These and other needs are met by certain embodiments of the present invention, which provide a fuel processing system for a fuel cell comprising at least one water gas shift reactor. The water gas shift reactor includes a first air inlet attached to a device for supplying air to the water gas shift reactor. A first water vaporizer supplies water vapor upstream of the water gas shift reactor.

The earlier stated needs are also met by certain embodiments of the present invention, which provide a fuel cell system comprising a fuel cell comprising an anode having a fuel inlet and a cathode having a first air inlet. At least one water gas shift reactor is upstream from the anode. The water gas shift reactor includes a second air inlet attached to a device for supplying air to the water gas shift reactor and a fuel outlet. A water vaporizer supplies water vapor to the water gas shift reactor. The water gas shift reactor discharges fuel through the fuel outlet downstream towards the anode.

The earlier stated needs are also met by certain embodiments of the present invention, which provide a method of shutting down a fuel cell system. The fuel cell system comprises a fuel cell including an anode and cathode; a fuel reformer; and a water gas shift reactor. The method comprises the sequential steps of shutting down electrical generation and then supplying air to the water gas shift reactor to oxidize CO and $H_2$ remaining in the water gas shift reactor after shutdown of electrical generation.

The present invention addresses the need for a fuel cell system that controls CO poisoning of fuel cells after the shutdown of electrical generation. The present invention addresses the need in the fuel cell art to eliminate the emission of flammable and poisonous CO and flammable $H_2$ gases from fuel cells after electrical shutdown. The present invention further addresses the need in the fuel cell art for rapid and efficient startup of electrical generation.

The present invention further addresses the need in the electrical vehicle art for motor vehicles powered by fuel cells that rapidly and efficiently generate electricity upon demand. In addition, the present invention addresses the need in the electrical vehicle art for motor vehicles powered by space and cost efficient fuel cell systems which do not require inert gas storage tanks, circulating lines, and blowers.

The foregoing and other features, aspects, and advantages of the present invention will become apparent in the following detailed description of the present invention when taken in conjunction with the accompanying drawing.

DETAILED DESCRIPTION OF THE INVENTION

Figure 1:
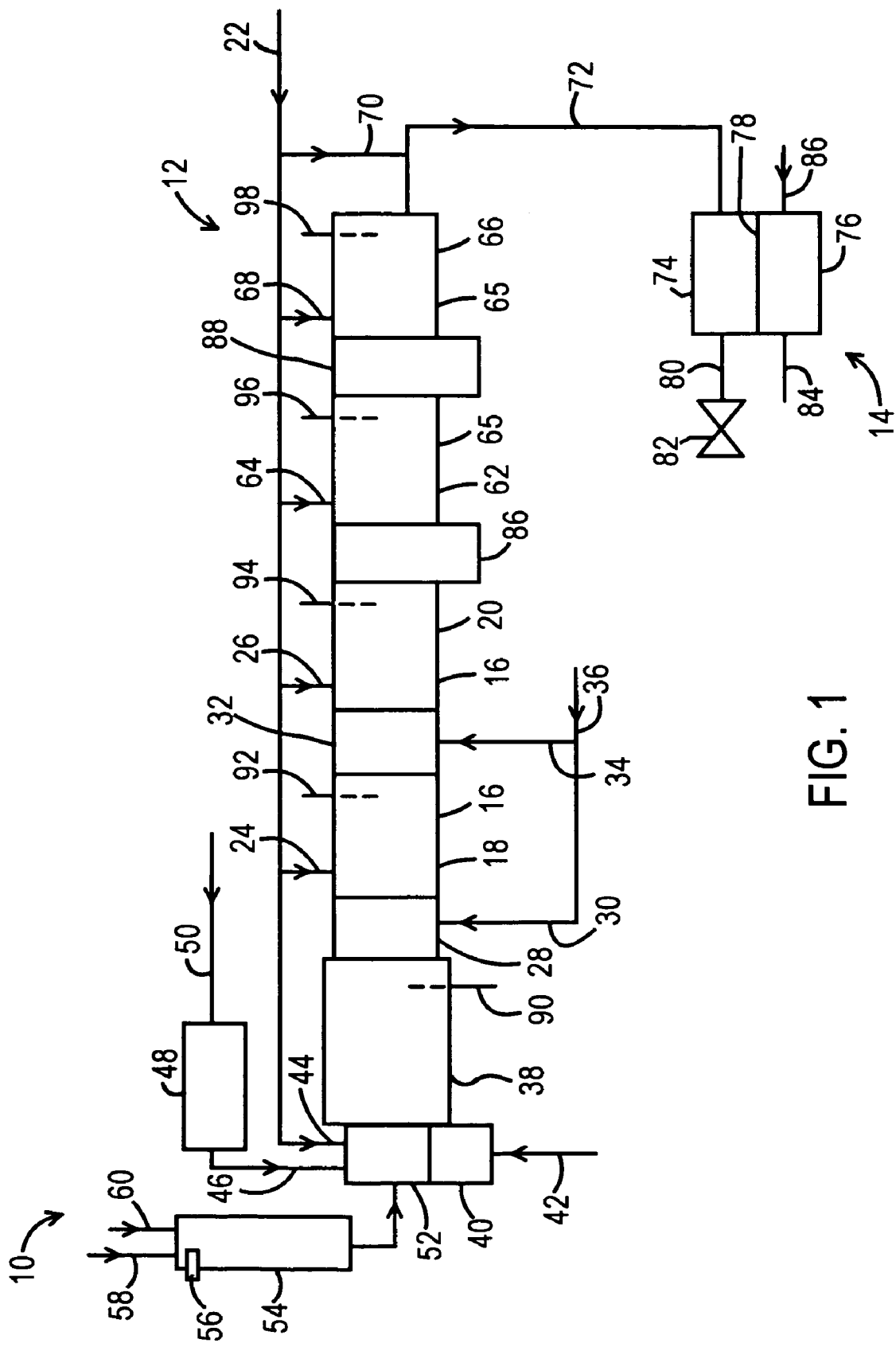
FIG. 1 schematically illustrates a fuel cell system according to an embodiment of the present invention.

The present invention provides methods of controlling the carbon monoxide poisoning of fuel cells after shutdown of electrical generation in fuel cell systems. The present invention also provides fuel cell systems that control carbon monoxide poisoning of fuel cells after shutdown, and rapidly and efficiently restart electricity generation after shutdown. The present invention further provides a fuel processing system that reduces the amount of carbon monoxide in the fuel cell system after electrical generation is shutdown.

A fuel cell system 10 according to certain embodiments of the present invention is illustrated in FIG. 1. The fuel cell system 10 comprises a fuel processing system 12 and a fuel cell 14. The fuel processing system (FPS) 12 comprises at least one water gas shift (WGS) reactor 16 including an air inlet 24, 26 attached to a device 22, such as an air circulating line or a blower for supplying air to the WGS reactor 16. The FPS 12 further comprises a water vaporizer 28 for supplying water vapor upstream of the WGS reactor 16. The water vaporizer 28 vaporizes liquid water introduced into the vaporizer 28 from a liquid water source 36 through a water inlet 30.

In addition to being a reactant in the water gas shift reaction, water is also used as a heat transfer medium. Furthermore, for some types of fuel cells, the hydrogen must be delivered to the fuel cell as a wet gas. In particular, in PEM fuel cells, water is required to avoid drying out the PEM membrane in the fuel cell. The water used in the fuel processing system is preferably deionized to remove dissolved metals and anions. Metals which could be harmful to catalysts include sodium, calcium, lead, copper and arsenic. Anions, such as chloride ions, should be reduced or removed from water. Removal of these cations and anions are required to prevent premature deactivation of the catalysts used in the fuel cell and system. The deionization of the water to be used in the process may be accomplished by any conventional means.

According to certain embodiments of the present invention, the water gas shift reactor 16 comprises a first WGS reactor 18 and a second WGS reactor 20 downstream from the first WGS reactor 18. The first WGS reactor 18 includes a first air inlet 24 and the second WGS reactor 20 includes a second air inlet 26. A first water vaporizer 28 supplies water vapor upstream of the first WGS reactor 18 and a second water vaporizer 32 supplies water vapor upstream of the second WGS reactor 20. The first water vaporizer 28 and second water vaporizer 32 are fed liquid water through respective water inlets 30, 34 from a liquid water source 36.

According to certain embodiments of the present invention, the FPS 12 further comprises a fuel reformer 38 upstream of the water gas shift reactor 16. Raw fuel is reformed by the fuel reformer 38. Fuel is introduced to a fuel vaporizer 48 through a fuel inlet 50 and the vaporized fuel is introduced into the upstream 52 of the fuel reformer 38. Air supplied from a device 22 supplying air is introduced into the upstream 52 of the fuel reformer 38 through an air inlet 44. In addition, liquid water is introduced into a water vaporizer 40 through water inlet 42 and vaporized water is subsequently introduced into the upstream 52 of the fuel reformer 38. When the fuel cell system 10 is restarted after a significant period of time, such that the FPS 12 has cooled below its operating temperature, it is necessary to heat the components of the FPS 12. Fuel and air are introduced into a startup burner 54 via a fuel inlet 58 and an air inlet 60 upstream of the fuel reformer 38. The fuel and air are introduced into the startup burner 54 and ignited, such as by a spark plug 56, the resulting hot gases are discharged from the startup burner 54 downstream to heat up the other components of the FPS 12.

According to certain embodiments of the present invention, at least one PROX reactor 65 is located downstream from the at least one WGS reactor 16. In certain embodiments of the present invention, the at least one PROX reactor 65 comprises a first PROX reactor 62 with a first air inlet 64 for supplying air to the first PROX reactor 65 and a second PROX reactor 66 with a second air inlet 68 for providing air to the second PROX reactor 66. The air inlets 64, 68 are attached to a device for supplying air 22. In certain embodiments of the present invention, the FPS 12 further comprises an air inlet 70 for supplying air downstream from the at least one PROX reactor 65.

According to certain embodiments of the present invention, the temperature of the fuel reformer 38 can be monitored by a temperature sensor 90, the temperature of the first WGS and second WGS reactors can be monitored by respective temperature sensors 92, 94, and the temperature of the first and second PROX reactors can be monitored by respective temperature sensors 96, 98.

After processing, the gas stream discharged from the FPS 12 is introduced to the fuel cell 14 via fuel inlet 72. A fuel cell comprises an anode 74 and cathode 76 separated by a separator 78. The fuel is supplied to the anode 74 through a fuel inlet 72 and air is supplied to the cathode 76 through an air inlet 86. Exhaust gases are discharged from the fuel cell through the anode exhaust line 80 and cathode exhaust line 84. In certain embodiments of the present invention, a shutoff valve 82 is located in the anode exhaust line 80.

In certain embodiments of the present invention, heat exchangers 86, 88 are located downstream from the WGS reactor 16. In certain embodiments of the present invention, a first heat exchanger 86 is located between the WGS reactor 16 and the PROX reactor 65. A second heat exchanger 88 is located between the first PROX reactor 62 and the second PROX reactor 66 in certain embodiments of the present invention. The heat exchangers 86, 88 can be used to transfer heat from the cell reformer 38 and WGS reactor 16 to the PROX reactor 65. The heat exchangers 86, 88 can also be used to control the temperature of the PROX reactor 65.

According to certain embodiments of the present invention, the FPS 12 contains a device 22 that supplies the necessary air to the fuel reformer 38, WGS reactor 16, and PROX reactor 65 to oxidize the CO and $H_2$ remaining in the FPS 12 after the shutdown of electrical generation of the fuel cell system 10. The FPS 12 further comprises water vaporizers 40 and 28 that provide water vapor upstream of the fuel reformer 38 and WGS 16 reactor, respectively. In this embodiment, the quantity of partly processed CO and $H_2$ remaining in the fuel reformer 38 and WGS 16 at shutdown are oxidized by the catalytic action in both the fuel reformer 38 and the WGS 16 reactor. CO and $H_2$ are oxidized and converted to the inert ingredients $CO_2$ and $H_2O$. This inhibits CO poisoning of the fuel reformer 38, WGS reactor 16, and PROX reactor 65 during shutdown and the loss of activity due to oxidation with $O_2$. By preventing CO intrusion into fuel cell at restart, any loss of processing performance due to CO poisoning of fuel cell is prevented, and the next restart ensured. Emission from the fuel cell system 10 of a regulated substance (CO) and flammable substances (CO and $H_2$) is also prevented.

Because the oxidation reaction between the incoming air and the CO and $H_2$ in the system generates reaction heat, the rate of temperature drop in the fuel reformer 38 and WGS reactor 16 is retarded. Because the FPS 12 remains above the minimum operating temperature for a longer period of time, fewer occasions of using the start burner 54 are required. The immediate generation of electricity under normal operating conditions results from "hot restart." Thus, the present invention provides more efficient and rapid startup.

In certain embodiments of the present invention, water vapor is supplied upstream 52 of the fuel reformer 38 and the WGS reactor 16 at the same time air is fed into the FPS 12. CO and $H_2$ are oxidized by catalytic action of the fuel reformer 38 and WGS reactor 16 preventing the emission of CO and $H_2$. Heat generated by the exothermic reactions is transferred to the PROX reactor 65 by the circulating water vapor to maintain a sufficiently high enough temperature for the preferential oxidation reaction to proceed.

Maintaining the PROX reactor 65 within the normal operating temperature range, a rich startup can be performed by the starter burner. When the start burner 54 performs rich startup, air is simultaneously supplied at the inlet 52 upstream of the fuel reformer 38, the air inlets 24, 26, of the first and second WGS reactors 18, 20, and the air inlets 64, 68 of the first and second PROX reactors 62, 66. Due to the air supply, the CO and $H_2$ generated by the rich startup gas are oxidized in the fuel reformer 38 and WGS 16, and the heat of reaction heating warms up the fuel reformer 38, WGS reactor 16, and PROX reactor 65. The oxidation function of the PROX reactor 65 prevents the emission of $H_2$ and CO outside the fuel cell system 10. Rich startup simplifies and shortens the restart procedure because it avoids the necessity of changing over from lean to rich operation, including purging the FPS 12 using a water buffer.

In certain embodiments of the present invention, the fuel cell 10 shutdown procedure is characterized in that air is supplied to the WGS reactor 16 before the reactor temperature falls below the temperature that allows restart. The air supply at the stage before the WGS reactor 16 is timed to supply air before the WGS reactor 16 temperature falls below the range that allows restart, based on the reading of temperature sensors 92, 94 installed in the reactors 18, 20. The oxygen in the air supply causes an oxidation reaction with the hydrogen and CO remaining in the reactors 18, 20, thus generating heat, and retarding the rate of temperature drop. At the same time, CO and $H_2$ in the reactor 16 are eliminated. Since the WGS reactor 16 temperature does not drop below the range that allows restart of the reactor 16, immediate restart of a fuel cell charged with reformate is always possible, as long as air is introduced at a sufficient flow rate to oxidize carbon monoxide.

In certain embodiments of the present invention, the FPS 12 shutdown procedure is characterized in that the temperature of the air supplied to the WGS reactor 16 does not exceed the maximum working temperature of the reactor 16. The quantity of air supplied to the WGS reactors 18, 20 is such that the temperature of each reactor does not exceed its working maximum, based on the reading of the temperature sensors 92, 94 installed in the respective reactors 18, 20. This prevents deterioration of the reactors 18, 20 due to exposure to excessive heat generated by the oxidation reaction of oxygen in the air supply with hydrogen and CO remaining in the reactor.

In certain embodiments of the present invention, the fuel processing system 12 and fuel cell 14 shutdown procedure is characterized in that whenever air is supplied to the WGS reactor 16, air is introduced into the PROX reactor 65 and downstream of the PROX reactor 65. The quantity of air supplied to the PROX reactor 65 and downstream of the PROX reactor 65 is sufficient to combust the CO and $H_2$ entering the PROX reactor 65 from upstream and the CO and $H_2$ inside the PROX reactor 65. Due to the incoming air, most of the CO and $H_2$ in the reactor undergoes oxidation reaction while in the WGS reactor 16, but a portion of it flows downstream without reacting. The flow rate of air supplied to the PROX reactor 65, at the most downstream point of the fuel supply system 12, is determined by estimating the quantity of incoming CO and $H_2$ due to the inflow of air upstream of the PROX reactor 65. In addition, the flow rate of air introduced at the PROX reactor outflow 72 is the rate necessary to oxidize the $H_2$ and CO flowing from the PROX reactor 65 in the presence of the catalyst in the fuel cell anode 74. Minimizing the flow of CO into the fuel cell anode 74 downstream of the FPS 12 ensures that the minimal quantity of CO entering the fuel cell 14 is oxidized on the precious metal in the fuel cell anode 74 by oxygen in the introduced air. This prevents degradation of processing performance due to CO poisoning of the fuel cell 14, ensures the next restart, and prevents the emission from the system 10 of an emission-regulated substance (CO) and flammable substances (CO and $H_2$).

In certain embodiments of the present invention, the FPS 12 and fuel cell 14 shutdown procedure is characterized in that high-temperature water vapor is generated and circulated in the fuel cell system 10 by supplying water upstream of the fuel reformer 38 and/or WGS reactor 16, and in that the movement of the high-temperature water vapor serves to transmit heat in the FPS 12 to the PROX reactor 65. The heat in the FPS 12 transmitted to the PROX reactor 65, maintains the PROX reactor 65 temperature at a high level for a long time, and the FPS 12 and the fuel cell anode 74 are filled with water vapor before the fuel cell system 10 shuts down. In addition, the transfer of heat to the PROX reactor 65 increases the probability of a rich restart using the start burner 54. This prevents the emission of $H_2$ and CO outside the fuel cell system 10 at rich startup, provided the PROX reactor 65 is within the temperature range that allows normal operation. At rich startup, the start burner 54 is operated at rich combustion, and air is supplied simultaneously to the fuel reformer 38, WGS reactors 18, 20, and PROX reactors 62, 66. The CO and $H_2$ in the rich startup gas are oxidized in fuel reformer 38 and WGS reactor 16, generating heat, and warming up the reactors 38, 16, 65. Rich startup simplifies and shortens the restart procedure, because it avoids the necessity of changing over from lean to rich operation.

In certain embodiments of the present invention, the FPS 12 and fuel cell 14 shutdown procedure is characterized in that whenever water is supplied to the fuel reformer 38 and/or WGS reactor 16, a sufficient quantity of air to combust the CO and $H_2$ in the PROX reactor 65 is introduced into the PROX reactor 65 and downstream of the PROX reactor 65. The flow rate of air supplied to the PROX reactor 65 and downstream of the PROX reactor 65 is sufficient to combust the CO and $H_2$ coming from upstream and the CO and $H_2$ in the PROX reactor 65. As a result, water vapor containing substantially no CO and $H_2$ reaches and fills the FPS 12 and the fuel cell anode 74 downstream of the FPS 12 before the fuel cell system 10 shuts down. Since the FPS 12 is filled with gas that is substantially free of CO, $H_2$, and $O_2$, the performance of the cell reformer 38, WGS reactor 16, and PROX reactor 65 is not degraded due to CO poisoning or oxidation during the shutdown period, and the emission of CO and $H_2$ from the fuel cell system 10 is prevented at restart.

In certain embodiments of the present invention, the fuel cell system 10 shutdown procedure is characterized in that the quantity of water supplied to the fuel reformer 38 and/or WGS reactor 16 does not allow the temperature of the fuel reformer 38 and WGS reactor 16 to exceed their working maximum temperatures, based on readings of the temperature sensors 90, 92, 94 installed in the fuel reformer 38 and WGS reactor 16. Thus, deterioration of the fuel reformer 38 and WGS reactor 16 due to exposure to excessive heat is prevented.

In certain embodiments of the present invention, after circulating sufficient water vapor in the fuel cell anode 74 located in and downstream of the FPS 12, the shutoff valve 82 provided downstream of fuel cell anode 74 is closed. Since the shutoff valve 82 is installed downstream of fuel cell anode 74 and operates after sufficient water vapor is circulated in and downstream of the FPS 12, the fuel reformer 38 and the fuel cell 14 remain substantially free of CO and $O_2$ during the shutdown period. The fuel reformer 38, WGS reactor 16, and the PROX reactor 65 do not lose activity during the shutdown period due to CO poisoning or oxidation by $O_2$ contained in the air, and the emission of CO and $H_2$ outside of the fuel cell system 10 at restart is substantially prevented.

The embodiments illustrated in the instant disclosure are for illustrative purposes. They should not be construed to limit the scope of the claims. Though the fuel cell systems described are particularly well suited to electrical vehicles, such as automobiles, the instant fuel cell systems are suitable for a wide variety of motor vehicles that are included within the scope of the instant claims including, motorcycles, buses, trucks, recreational vehicles, and agricultural and industrial equipment. As is clear to one of ordinary skill in this art, the instant disclosure encompasses a wide variety of embodiments not specifically illustrated herein.

What is claimed is:

1. A method of shutting down a fuel cell system, said fuel cell system comprising:
   a fuel cell including an anode and cathode;
   a fuel reformer; and
   a water gas shift reactor, the method comprising the sequential steps of:
   shutting down a supply of reformate from the fuel reformer to the water gas shift reactor to start a shutdown procedure of electrical generation of the fuel cell; and
   supplying air to the water gas shift reactor to oxidize CO and $H_2$ remaining in the water gas shift reactor after the shutdown procedure of electrical generation of the fuel has been started.

2. The method of shutting down a fuel cell system according to claim 1, wherein air is supplied to the water gas shift reactor before the water gas shift reactor falls below a temperature that allows restarting of electrical generation.

3. The method of shutting down a fuel cell system according to claim 1, wherein the air supplied to the water gas shift reactor does not exceed a maximum working temperature of the water gas shift reactor.

4. The method of shutting down a fuel cell system according to claim 1, wherein the fuel cell system further comprises a preferential oxidation reactor downstream from said water gas shift reactor, further comprising the step of supplying air to the preferential oxidation reactor after shutdown of electrical generation when air is supplied to the water gas shift reactor.

5. The method of shutting down a fuel cell system according to claim 4, wherein said air supplied to the preferential oxidation reactor is sufficient to oxidize CO and $H_2$ in the preferential oxidation reactor and CO and $H_2$ entering the preferential oxidation reactor after shutdown of electrical generation.

6. The method of shutting down a fuel cell system according to claim 5, wherein the fuel cell system further comprises a fuel reformer upstream from said water gas shift reactor, further comprising the step of supplying air to the fuel reformer after shutdown of electrical generation when air is supplied to the water gas shift reactor and the preferential oxidation reactor.

7. The method of shutting down a fuel cell system according to claim 6, further comprising the steps of supplying water upstream of the fuel reformer and supplying water upstream of the water gas shift reactor during the shutdown procedure, wherein the water supplied upstream of the fuel reformer and upstream of the water gas shift reactor transfers heat from the fuel reformer and water gas shift reactor to the preferential oxidation reactor during the shutdown procedure.

8. The method of shutting down a fuel cell system according to claim 7, wherein whenever water is supplied to the fuel reformer and the water gas shift reactor after the shutdown of electrical generation a sufficient quantity of air is supplied to the preferential oxidation reactor to combust CO and $H_2$ in the preferential oxidation reactor and downstream from the preferential oxidation reactor.

9. The method of shutting down a fuel cell system according to claim 7, wherein the fuel cell system comprises temperature sensors in the water gas shift reactor and the fuel reformer, and the quantity of water supplied to the water gas shift reactor and the fuel reformer is controlled so that the temperature of the water gas shift reactor does not exceed the maximum working temperature of the water gas shift reactor as measured by the temperature sensors.

10. The method of shutting down the fuel cell system according to claim 7, wherein the fuel cell system further comprises a shutoff valve downstream from the fuel cell anode, further comprising circulating water vapor through the anode and shutting off the shutoff valve after a sufficient quantity of water vapor has circulated through the anode.

11. In a fuel cell system that includes at least one water gas shift reactor, a fuel reformer upstream of the water gas shift reactor, at least one preferential oxidation reactor downstream of the water gas shift reactor, and at least one fuel cell downstream of the preferential oxidation reactor,
   a method of shutting down the fuel cell system, the method comprising the steps of:
   shutting down a supply of reformate from the fuel reformer to the water gas shift reactor to start a shutdown procedure of electrical generation of the fuel cell;
   monitoring a temperature of at least one of the fuel reformer, the water gas shift rector and the preferential oxidation reactor;
   supplying air to the water gas shift reactor and also to the preferential oxidation reactor in response to the monitored temperature after the shutdown procedure of electrical generation of the fuel cell has been started at a quantity such that the temperature of each of the water gas shift reactor and the preferential oxidation reactor is lower than a maximum working temperature of the reactor; and
   transferring heat generated due to oxidation by the supplied air within the fuel reformer and the water gas shift reactor to the preferential oxidation reactor by supplying vaporized water to upstream of the water gas shift reactor in response to the monitored temperature after the shutdown procedure of electrical generation of the fuel cell has been started in order to maintain the temperature within the preferential oxidation reactor high enough for oxidation reaction to proceed.

12. In a fuel cell system for an automobile, the fuel cell system including at least one water gas shift reactor, a fuel reformer upstream of the water gas shift reactor, at least one preferential oxidation reactor downstream of the water gas shift reactor, and at least one fuel cell downstream of the preferential oxidation reactor,
   a method of shutting down the fuel cell system, the method comprising the steps of:
   shutting down a supply of reformate from the fuel reformer to the water gas shift reactor to start a shutdown procedure of electrical generation of the fuel cell;
   monitoring a temperature of at least one of the fuel reformer, the water gas shift rector and the preferential oxidation reactor;
   supplying air to the water gas shift reactor and also to the preferential oxidation reactor in response to the monitored temperature immediately after the shutdown procedure of electrical generation of the fuel cell has been started at a quantity such that the monitored temperature is lower than a predetermined maximum working temperature of the reactor; and
   transferring heat generated due to oxidation by the supplied air within the fuel reformer and the water gas shift reactor to the preferential oxidation reactor by supplying vaporized water to upstream of the water gas shift reactor in response to the monitored temperature immediately after the shutdown procedure of electrical generation of the fuel cell has been started in order to maintain the temperature within the preferential oxidation reactor high enough for oxidation reaction to proceed.

* * * * *